HOMODYNE REFERENCE GENERATOR HAVING VOLTAGE CONTROLLED PHASE
Filed July 30, 1965
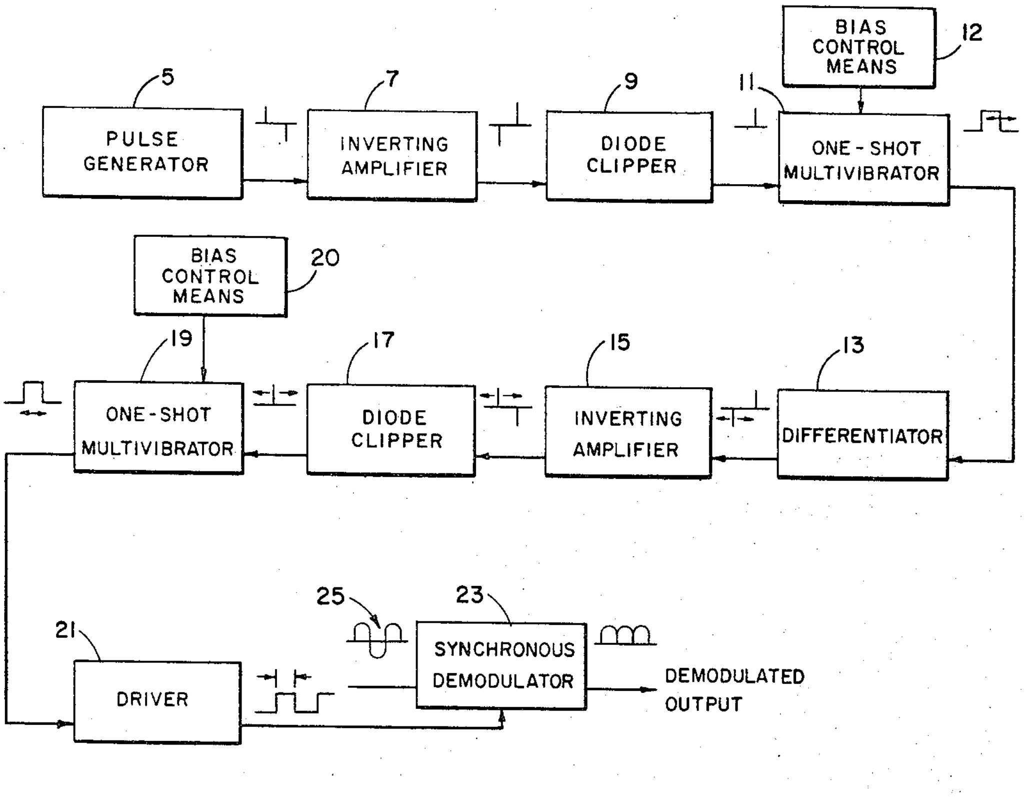
Anthony J. G. Prasil,
INVENTOR.
Harry M. Saragovitz
BY Edward J. Kelly
Herbert Berl
Jack H. Voigt United States Patent Office 3,417,337
Patented Dec. 17, 1968

3,417,337

HOMODYNE REFERENCE GENERATOR HAVING VOLTAGE CONTROLLED PHASE

Anthony J. G. Prasil, Rochester, N.Y., assignor, by mesne assignments, to the United States of America as represented by the Secretary of the Army Filed July 30, 1965, Ser. No. 476,215
5 Claims. (Cl. 329—50)

ABSTRACT OF THE DISCLOSURE

A device for producing a phase-adjustable square wave wherein a positive pulse spike is used to key a first monostable multivibrator whose pulse duration may be varied. The output of the multivibrator is then differentiated, the variable component of the differentiated output being used to key a second monostable multivibrator whose pulse duration may also be varied. The output of the second multivibrator is a phase-adjustable square wave.

The invention described herein relates to a reference signal generator and more particularly to a reference signal generator whose phase is controlled by a D-C bias voltage.

A reference generator is an essential part of a homodyne amplifier system. The generator supplies a square wave to a synchronous demodulator having a frequency the same as that of the signal to be demodulated, and having a phase which is adjustable. The phase must be set to an optimum value to give a maximum signal output from the synchronous demodulator, otherwise the output might go through zero to a negative polarity. The phase could be most conveniently adjusted by means of an electrical control while watching for a maximum in the voltage output of the demodulator.

In view of these facts, an object of this invention is to provide a device which will shift the phase in a reference generator output by varying a D-C control voltage.

Another object of this invention is to provide a much more versatile reference generator.

A further object of this invention is to provide a much more reliable reference generator.

A still further object of this invention is to provide a less expensive reference generator.

Various other objects and advantages will appear from the following description of the preferred embodiment of the invention, and the most novel features will be particularly pointed out hereinafter in connection with the appended claims and the accompanying drawing of the claimed invention wherein the single figure drawing is a block diagram according to the present invention.

Referring now to the drawing synchronizing pulse generator 5 generates a pulse having a forward positive spike followed by a negative spike as shown in the drawing. Such an output waveform may be produced by various known methods. An example would be a free running multivibrator feeding a differentiator to produce a pulse having a forward positive spike followed by a negative spike. An inverting amplifier 7 receives the pulse generated by generator 5 and inverts the spikes. The output of amplifier 7 is fed into diode clipper circuit 9 which clips the negative spike of the pulse. The output of the clipper is fed into one-shot multivibrator 11 and the square wave output is fed into differentiator 13. The pulse is then back into the shape as it first was out of generator 5 except the negative spike can be shifted in time or phase depending on the bias applied to one of the two triodes comprising the one shot multivibrator. This pulse is inverted by amplifier 15 connected to the output of differentiator 13. The negative spike of the pulse is clipped by diode clipper 17 and the positive spike output is fed into one-shot multivibrator 19 whose output is a square wave that is phase adjustable. Both multivibrators 11 and 19 have adjustable grid bias voltages whereby, the duration of the output pulse can be varied. This adjustment is widely used in one-shot multivibrators as shown in Terman Frederick E. Electronic and Radio Engineering, New York, Mc-Graw-Hill, 1955, p. 632. The square wave is fed into driver 21 where it is amplified and then fed into synchronous demodulator 23 along with a signal 25 of the same frequency which is to be demodulated.

The reference generator system described here is with the pulse generator 5 and synchronous demodulator 23 with which it is used to constitute a homodyne amplifier system. Its operation is as follows:

The synchronizing pulses are first amplified by inverting amplifier 7 in order to actuate one-shot multivibrator 11. The one shot is triggered by a positive pulse and in turn produces a single positive square wave. The start of the square wave coincides with the trigger while the length or duration of the wave is a function of the grid bias applied from bias control means 12 to one of the triodes as discussed above. A wide range of square-wave durations is obtained by this method. This bias control is the phase adjusting control of the reference generator 5.

The square wave pulses produced by multivibrator 11 are then differentiated by differentiator 13 to give a positive spike at the beginning and a negative spike at the end. The positive spike then is stationary while the negative shifts position according to the setting of the control bias. The pulses then go through an inverting amplifier 15 to invert their polarity so that the movable pulse is positive and can trigger multivibrator 19 once the negative spike has been clipped by diode clipper 17. Multivibrator 19, also, has an adjustable bias means 20 like multivibrator 11. This control is used to produce equal on and off times for the square wave output. Multivibrator 19, therefore, produces a square wave which can be shifted back and forth in time or phase by the bias control of multivibrator 11. The square wave is then amplified by driver 21 so that it can be used to operate synchronous demodulator 23.

What is claimed is:

1. A reference generator comprising: a first multivibrator having an input and an output; said output being a first square wave output; a pulse generator; a first amplifier; a first clipper means; said pulse generator having an output connected to an input of said first amplifier, and said first clipper means being connected between an output of said first amplifier and said input of said first multivibrator; a second multivibrator having an input and an output; and signal converting means connected between said output of said first multivibrator and said input of said second multivibrator whereby said signal converting means produces a pulse output which corresponde in time with a trailing adge of said first square wave.

2. A reference generator as set forth in claim 1 wherein said signal converting means comprises: a differentiator means; a second amplifier; a second clipper means; an input to said differentiator means connected to said output of said first multivibrator; an input of said second amplifier connected to an output of said differentiator means; and said second clipper means connected between an output of said second amplifier and said input of said second multivibrator.

3. A reference generator as set forth in claim 1 wherein said first multivibrator has control means controlling the duration of said first square wave output and wherein the output of said second multivibrator is a second square wave; said second square wave being phase adjustable according to the output of said first multivibrator; and said second square wave being further adjustable by a bias control means in said second multivibrator for adjusting on and off times for said second square wave output.

4. A reference generator as set forth in claim 2 wherein said first and second clipper means is a diode clipper circuit which clips negative spikes from signals applied thereto.

5. A reference generator having voltage controlled phase comprising: a synchronous demodulator; said demodulator having a first and second input and an output; said first input disposed for receiving a signal which is to be demodulated; a pulse generator; said pulse generator output being synchronized with said modulated signal; said pulse generator capable of producing pulses having a forward positive spike and a trailing negative spike spaced in time predeterminately; a first inverting amplifier connected to receive said pulses from said pulse generator; said first amplifier producing output pulses voltage inverted with respect to said pulses from said pulse generator; a first clipper; said first clipper connected to receive said inverted pulses from said first amplifier; said first clipper removing negative spikes from said pulses applied thereto, thus producing an output of first positive spikes; a first monostable multivibrator connected to receive said output of said first clipper; said first multivibrator having an adjustable bias voltage means whereby a first square wave output produced by each positive spike is controlled in duration;

a differentiator means connected to receive said square wave output of said first multivibrator; said differentiator means producing an output pulse having a forward positive spike and a trailing negative spike; a second inverting amplifier connected to receive said output of said differentiator means; said second amplifier producing output pulses voltage inverted with respect to said pulses from said differentiator means; a second clipper; said second clipper connected to receive said inverted pulses from said second amplifier; said second clipper removing negative spikes from said pulses applied thereto, thus producing an output of second positive spikes; a second monostable multivibrator connected to receive said output of said second clipper; said second multivibrator having an adjustable bias voltage means whereby a second square wave output produced by each positive spike is controlled in duration whereby along with said control of said first multivibrator both the on and off time of said second square wave is adjustable; said second square wave output connected to said second input of said synchronous demodulator through a drive means.

References Cited

UNITED STATES PATENTS

| | | | |
|---|---|---|---|
| 2,883,650 | 4/1959 | Brockway | 328—133 X |
| 3,263,222 | 7/1966 | Coleman et al. | 328—63 X |

ALFRED L. BRODY, *Primary Examiner.*

U.S. Cl. X.R.

328—133, 74, 63, 201; 307—265, 269, 495; 331—50; 340—206